United States Patent [19]

Ives

[11] Patent Number: 4,828,432
[45] Date of Patent: May 9, 1989

[54] APPARATUS FOR FORMING A CONTINUOUS PLASTIC SHEET

[75] Inventor: Frank E. Ives, Kent, Wash.

[73] Assignee: PMC, Inc., Sun Valley, Calif.

[21] Appl. No.: 926,583

[22] Filed: Nov. 4, 1986

[51] Int. Cl.$^4$ .................. E01C 19/00; E02B 11/02; B05C 11/02

[52] U.S. Cl. ............................ 405/270; 405/268; 405/303; 156/538; 156/574; 156/575; 156/577; 404/100

[58] Field of Search ............. 405/268, 270, 303; 156/71, 391, 538, 523, 574, 575, 577; 425/59, 62; 404/100, 101; 242/76; 226/196; 104/307

[56] References Cited

U.S. PATENT DOCUMENTS

| | | | |
|---|---|---|---|
| 473,009 | 4/1892 | Lyon | 405/270 |
| 3,060,077 | 10/1962 | Kauer | 156/575 X |
| 3,617,423 | 11/1971 | Nyon et al. | 156/575 |
| 4,087,296 | 5/1978 | Hooker | 156/71 |
| 4,456,399 | 6/1984 | Conover | 404/100 |

FOREIGN PATENT DOCUMENTS

| | | | |
|---|---|---|---|
| 3319401 | 2/1985 | Fed. Rep. of Germany | 156/391 |
| 595512 | 2/1978 | Switzerland | 104/307 |
| 329287 | 3/1972 | U.S.S.R. | 405/270 |
| 643579 | 1/1979 | U.S.S.R. | 405/270 |
| 773186 | 10/1980 | U.S.S.R. | 405/268 |
| 1158658 | 5/1985 | U.S.S.R. | 405/270 |
| 1431546 | 4/1976 | United Kingdom | 405/270 |

Primary Examiner—Randolph A. Reese
Assistant Examiner—John A. Ricci
Attorney, Agent, or Firm—Christensen, O'Connor, Johnson & Kindness

[57] ABSTRACT

Apparatus for lining an irrigation canal with a sheet of fiber-reinforced plastic includes structure for depositing a layer of resin and fiber on a web of flexible carrier material, partially curing the resin prior to laying the sheet in the canal, and then laying the sheet in the canal while the resin is flexible enough to conform to the shape of the canal. The final curing of the resin takes place after the sheet is placed in the canal. A predetermined-shape wrinkle is induced in the carrier web before it is laid into the canal to assist in conforming the sheet to the canal shape without causing randomly placed wrinkles so that the sheet is smooth in the canal. The apparatus forms the sheet and is propelled so that it travels along the length of the canal, fabricating a continuous sheet as it travels. In one embodiment the carrier is a flexible but nonelastic material like kraft paper, coated on one side with wax or other film to prevent saturation by the resin.

15 Claims, 5 Drawing Sheets 4,828,432

APPARATUS FOR FORMING A CONTINUOUS PLASTIC SHEET

BACKGROUND OF THE INVENTION

This invention relates to the formation of large-scale, continuous fiber-reinforced plastic (FRP) sheets and more particularly relates to the formation and application of such sheets to a terrain surface for the purpose of preventing moisture from seeping into the terrain. The invention also contemplates an apparatus for the on-site fabrication and installation of the plastic sheets.

In certain situations it is sometimes desirable to prevent the seepage of moisture into the ground in certain defined areas. An example of such a situation is in a irrigation system where the water is carried through fields in a shallow canal. In order to maintain a constant flow of water in the canal without excess seepage into the canal walls it has been standard practice to line the canals with concrete. While the concrete liners are effective in reducing the water seepage into the ground, it has been found that after a few years the concrete liners tend to deteriorate, particularly in cold climates which freeze during the winter. Frost heave caused by the freezing and thawing of the ground beneath the concrete liner causes cracks in the concrete and, once the cracks form, water seeping into the cracks freezes and thaws, exaggerating the cracks until it reaches the point where large sections of the canal lining will change position relative to an adjacent section so that water running through the canal will become agitated by the passage over the uneven surface. Also, seepage through the cracks in the concrete can cause the loss of a large amount of water from the beginning to the end of the canal. In an canal of any significant length, the water loss through seepage can be up to 50%.

Typically, using current methods, once the concrete has deteriorated to a point where it is seriously affecting water flow, it is necessary to refurbish the canal by removing the old concrete lining and pouring a new concrete liner in the canal. The cost of the refurbishment operation is usually greater than the initial installation cost because of the cost to remove the old concrete prior to pouring a new concrete liner. Attempts have also been made to line the canals by laying a relatively thick film of flexible water-impermeable material such as, polyethylene or vinyl, in the canal. One problem that has been discovered with use of such thick polyethylene or vinyl film is that if a significant amount of water at typical velocity is channeled down the canal it will tend to drag the film with it, causing wrinkling of the film, which, again, changes the water flow characteristics. In other instances the film is covered with dirt and coarse gravel, also decreasing the efficiency of operation of the canal system. Also, since the canals are in agricultural environments it is not unusual for livestock to walk in the canal. The polyethylene film is easily damaged by the hooves of the livestock, as well as by covering with dirt and rock and during installation.

It is therefore an object of the present invention to provide a method of sealing a terrain surface, such as an irrigation canal, with a waterproof material that is resistant to mechanical damage.

It is another object of this invention to provide a method of sealing the surface of an irrigation canal that is resistant to extreme changes in temperature and that provides a smooth surface for passage of water so that the hydrodynamic characteristics of the canal system are not affected by the sealing method.

It is another object of the invention to provide an apparatus for performing the sealing method on-site.

SUMMARY OF THE INVENTION

In accordance with the above-stated objects, a method of applying a continuous sheet of sealing material to a prepared section of terrain includes the steps of applying a layer of resin and fibers onto a flexible carrier, laying the carrier on the terrain after the resin has begun to cure but before cure is complete, so that the flexible carrier will approximately conform to the shape of the terrain, and, allowing the cure to complete so that a rigid resin and fiber liner is present over the terrain section. In a preferred embodiment of the invention, a flexible but nonelastic carrier is used, for example, kraft paper having a thin moisture barrier, such as polyethylene film or a wax coating, formed on one side to prevent saturation of the paper by the resin.

A machine to fabricate and apply the sheet of sealing material to the terrain on-site is also provided that includes at least one reciprocating resin and fiber application means. A supply of a sheet-form carrier material is carried on the machine and is fed by a feeding means over a platform beneath the resin and fiber application means so that a layer of resin and fiber can be deposited on the carrier sheet. The feeding means then moves the carrier with the resin and fiber layer on it out of the machine and edrapes it onto the terrain surface. The machine is preferably self-propelled and has propulsion means to move it along the terrain surface so that as the machine moves the carrier sheet is deposited behind it. Preferably, a heating means is mounted on the machine and the carrier and resin pass in proximity to the heating means to ensure the start of resin cure just prior to the sheet leaving the machine. The resin cure is completed while the carrier sheet and resin layers lie on the terrain surface.

In a situation in which the terrain section being covered is a ditch or canal and the carrier is a flexible but nonelastic material such as paper it is necessary to manipulate the carrier sheet as it leaves the machine prior to its being laid on the terrain surface in order to prepare the sheet to conform to the concave surface of the ditch without wrinkling in a haphazard manner. The manipulation preferably involves the formation of a predefined wrinkle in the paper carrier closely adjacent its exit point from the machine. The wrinkle is formed by a wrinkle-inducing means that is attached to and trails behind the machine as it moves across the terrain.

BRIEF DESCRIPTION OF THE DRAWINGS

The operation and advantages of the present invention will be better understood by those of ordinary skill in the art and others upon reading the ensuing specification when taken in conjunction with the appended drawings wherein.

DETAILED DESCRIPTION OF THE PREFERRED EMBODIMENT

The method and apparatus of the present invention will be described with reference to the placement of a continuous fiber-reinforced plastic sheet over a drainage canal or irrigation canal and it is believed that this will be one of the major environments in which the method and apparatus of the present invention will be used. However, the method can be used to put down a moisture-impervious barrier over a graded road surface prior to the application of asphalt in order to prevent moisture from getting beneath the asphalt and freezing, causing frost heaving and damage to the asphalt surface. The method can also be used in other instances where a large surface area needs to be covered with a rigid moisture barrier, for example, ponds and containment areas. Therefore, the description of the invention with regard to lining of a water-carrying canal for irrigation is not intended to be limiting but rather is exemplary of one of the potential uses of the invention.

Figure 1:
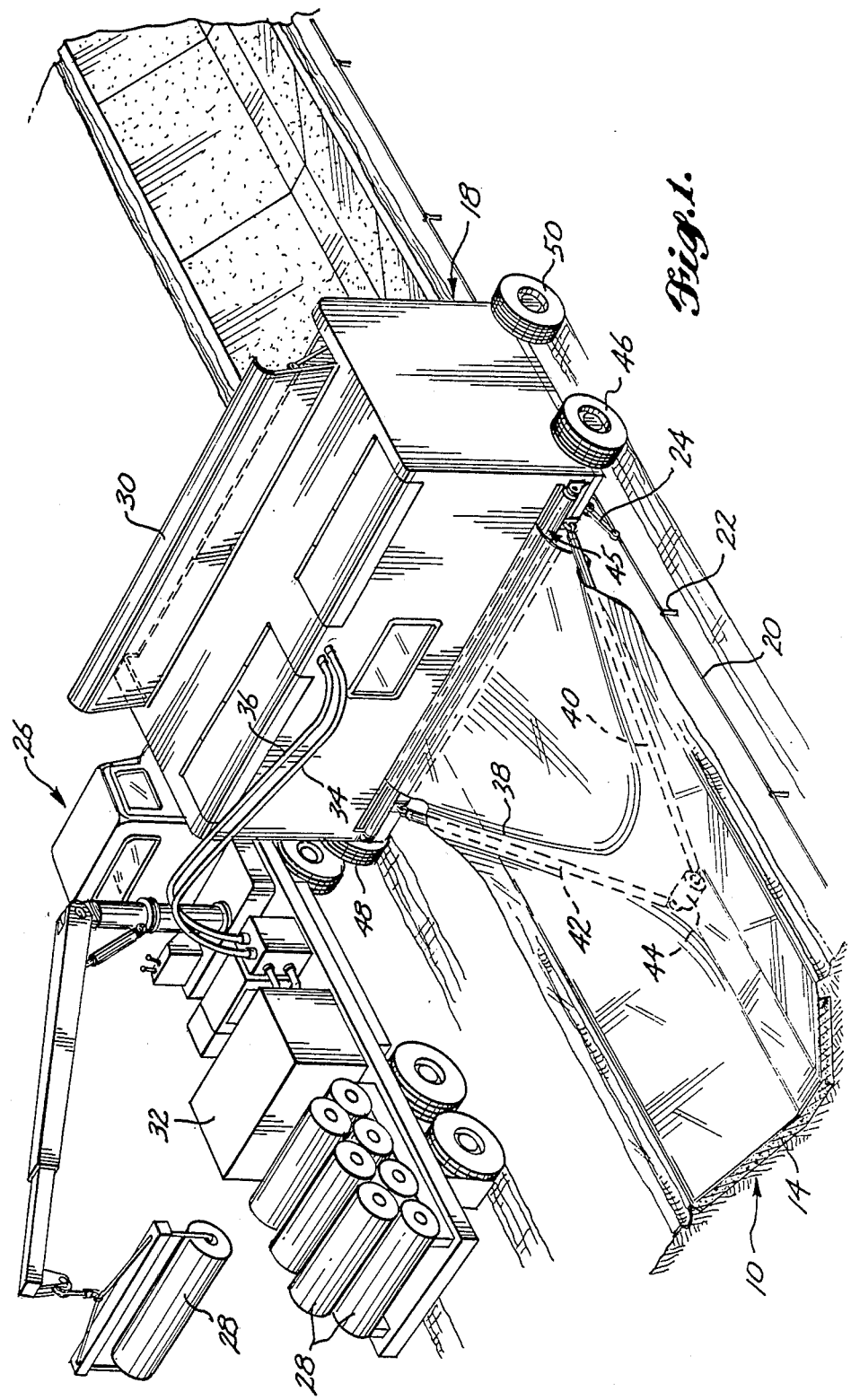
FIG. 1 is an isometric view of one embodiment of a sheet fabricating apparatus made in accordance with the principles of the present invention laying a sheet of sealing material down over a canal.

Referring now to FIG. 1, a typical irrigation canal 10 having a substantially V-shaped cross section with slightly flattened bottom 12 is illustrated. The canal 10 shown in FIG. 1 has a concrete liner 14 already laid down in it and an apparatus made in accordance with the principles of the present invention is shown depositing a continuous plastic sheet 16 over the top of the concrete liner 14. A wheeled fabricating apparatus 18 made in accordance with the principles of the present invention is illustrated straddling the canal. The fabricating apparatus 18 is self-propelled so that it can move along the length of the canal 10. The fabricating apparatus 18 produces a continuous sheet of plastic by depositing a resin and fiber mixture onto a carrier web which is then trailed from the apparatus 18 so that it lies into the canal, covering the concrete liner and overhanging the edges slightly. A guidewire 20 supported by a series of guideposts 22 installed along one edge of the canal cooperates with a guide arm 24 that extends from the fabricating apparatus 18 and is connected to the propulsion means of the fabricating apparatus to guide the fabricating apparatus and keep it moving in line with the canal.

A supply truck 26 is shown adjacent the canal. The supply truck 26 moves along with the fabricating apparatus 18 and provides the necessary materials to the fabricating apparatus 18 to enable it to continue to produce the plastic sheet 16. The supply truck 26 carries rolls of the paper 28 carrier web that can be lifted onto the fabricating apparatus and loaded through the forward supply door 30, which is shown in the open position. The truck 26 also carries a tank 32 of resin and catalyst, which is pumped through supply hoses 34, 36 to the fabricating apparatus 18 to supply a constant flow of resin and catalyst to the fabricating apparatus.

In the environment shown in FIG. 1, in which the continuous sheet 16 is being laid into a canal of concave cross section, the use of a carrier web that is flexible but not elastic can cause problems in that the sheet material will wrinkle as it is laid into the canal due to the essentially two-dimensional sheet material having to conform to a three-dimensional shape. If the sheet 16 is allowed simply to drape behind the fabricating apparatus 18 into the canal, a number of randomly placed wrinkles will appear in the sheet as it attempts to conform to the concave shape of the canal. It has been found, however, that, by inducing a wrinkle 38 of predetermined shape into the sheet 16 at a location located near the exit point of the sheet 16 from the fabricating apparatus 18, the sheet will conform more smoothly to the canal contour. The placement of the wrinkle 38 of predetermined shape eliminates the randomly located wrinkles that otherwise would occur. In order to induce the wrinkle 38 into the sheet 16, the sheet 16 is draped over a set of wrinkle-inducing rollers 40, 42 rotatably attached to the rear of the fabricating apparatus 18 and connected at their opposite ends in a rotatable manner to a bottom-riding roller 44, which is free-rotating and rides along the bottom 12 of the canal. The sheet material draped from the rear of the fabricating apparatus 18 is under some tension caused by the drag of the sheet that is already in the canal. However, a tension relieving roller 45 is located at the rear of the fabricating apparatus 18 to relieve the tension on the carrier web and permit the sheet 16 to sag immediately after it leaves the fabricating apparatus. The sheet 16 is then raised up over the wrinkle-inducing rollers 40, 42 to shape the sheet 16 into a wrinkle 38 that starts at the outer edges of the sheet 16 and moves obliquely and rearwardly to the center of the sheet 16. As the wrinkle 38 extends from each of the opposing edges of the sheet 16 and moves toward the center of the sheet 16 it tends to flatten out, allowing the sheet 16 to take the shape of the canal 10. Since the cure of the resin is not complete at this time, the carrier web with the resin layer deposited thereon is able to conform to the canal shape. As the resin cures, the plastic sheet 16 will become rigid to form a permanent liner for the canal 10.

Figure 2:
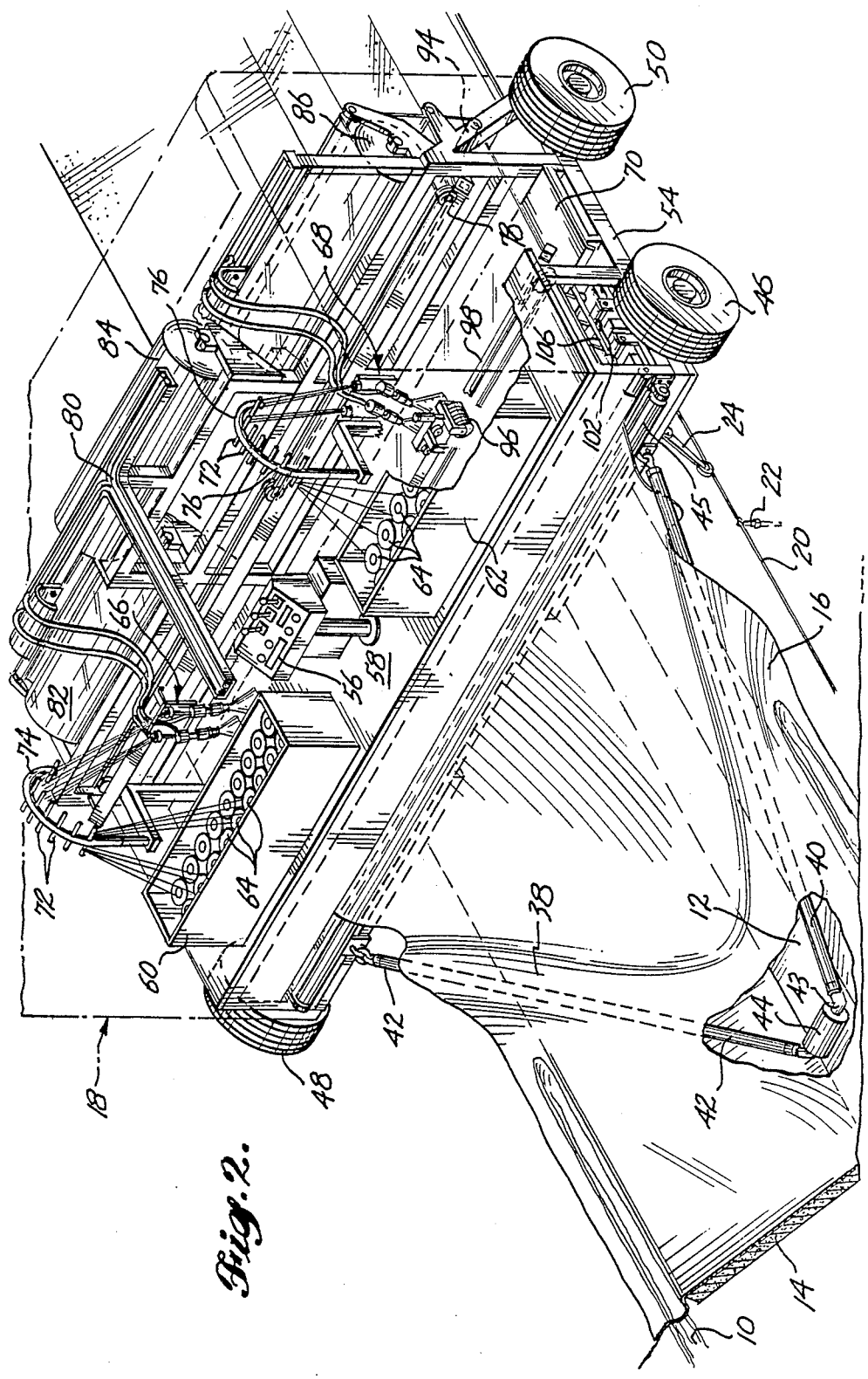
FIG. 2 is a isometric view of the sheet fabricating machine shown in FIG. 1 with the cover removed.

FIG. 2 shows the sheet-fabricating apparatus 18 with the cab removed. The fabricating apparatus has wheels 46, 48, 50, 52 that are rotatably mounted to a base frame 54. The two rear wheels 46, 48 are driven by hydraulic motors mounted in the wheel hubs and controlled from the central control panel 56 located centrally on a baseplate 58 that is supported above the base frame 54. Also mounted on the baseplate 58 are two rectangular box-like containers that hold rolls 64 of a fiber roving to be fed through a pair of reciprocating chopper guns 66, 68 that deposit the resin and fiber onto a paper carrier web 70. The roving is fed through eyes 72 mounted in outrigger fashion from an arcuate roving guide 74, 76 associated with each one of the roving boxes. The dual-nozzle chopper guns 66, 68 are mounted on a rail 78 with stretches transversely the width of the fabricating apparatus and is supported on the base structure. The chopper guns 66, 68 move back and forth across the rail 78 so as to cover the entire carrier web 70. Resin is fed to the chopper guns 66, 68 through hoses that rest in a T-shaped rail 80 mounted on the base frame 54 near the top of the apparatus.

Figure 3:
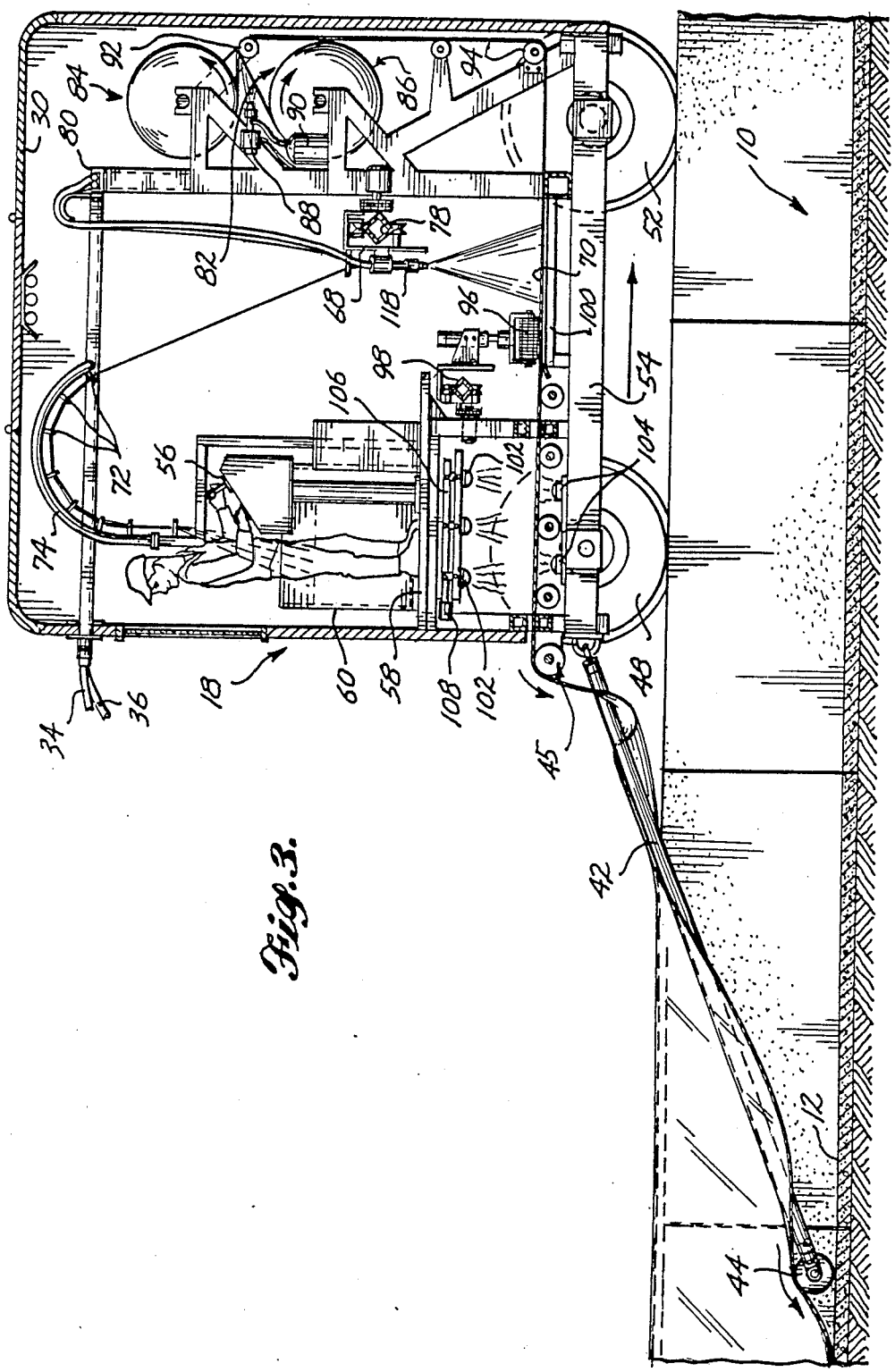
FIG. 3 is a side elevational view of the machine shown in FIG. 2.

It can be seen in FIG. 2 that the carrier web 70 is actually comprised of three overlapping sheets of paper taken from rolls 82, 84, 86 that are rotatably suspended on the frame of the fabricating apparatus. The adjacent rolls of paper overlap one another by a few inches so that there are not open seams. FIG. 3 shows a glue gun 88 mounted on the frame that sprays glue from a reservoir 90 onto the overlapped portion of the paper from the rolls to securely join the paper sheets to one another to forma single wide carrier web. The width of the carrier web can be adjusted by using one, two, or three of the rolls 82, 84, 86 at any one time or by changing the size of the rolls 82, 84, 86 to accommodate canals of different widths.

As can be best seen in FIG. 2, the wrinkle-forming outrigger that trails the fabricating apparatus comprises the long thin roller 40 rotatably mounted at a first end to the rear of the base frame 54 and the second long thin roller 42 also rotatably mounted to the opposite side of the base frame 54. These two wrinkle-inducing rollers are both rotatably connected at their second ends to an axle 43 on which is rotatably mounted the bottom roller 44 that rides along the bottom of the canal. The roller 45 is powered to pull the carrier web 70 at a rate sufficient to relieve the tension in the web that would otherwise be present because of the drag caused by the weight of the sheet that is already in the canal. With the tension in the web 20 relieved, the carrier sheet 70 with resin and fiber deposited thereon drapes over the wrinkle-inducing rollers 40, 42 as it leaves the rear of the fabricating apparatus and the rollers 40, 42 act on the sheet to assist in conforming it to the shape of the canal immediately behind the machine.

As can be seen in FIG. 3, as the paper sheets come off of their respective rolls 82, 84, 86 they all pass over a common roller 92 mounted at the upper front end of the frame and a second roller 94 mounted at the lower front end of the frame. The paper then passes over a series of free-turning rollers mounted in the base frame beneath the baseplate and exits through a slot formed in the rear of the cab. The resin and chopped fibers are deposited on the paper from the chopper guns 66, 68 which are reciprocating back and forth across the width of the machine over the paper to apply an evenly distributed layer of the resin and fiber. After the resin and fiber layer is deposited, the paper passes beneath a pressure roller 96 that is also mounted for reciprocating movement across the sheet-forming apparatus on a rail 98 mounted to the frame 54. The pressure roller 96 rolls across the resin layer, pressing against a table 100 to remove any air bubbles from the resin layer. Although a single roller 96 is shown, it may, in some cases, be necessary to use two rollers reciprocating simultaneously to achieve sufficient speed of travel across the sheet so that all of the resin layer is rolled prior to its exit from the machine.

A group of heater elements 102 is mounted below the baseplate 58 and above the resin sheets and another group of heater elements 104 is located on the frame below the resin sheets to provide heating as necessary to speed up the cure of the resin prior to its exit from the machine. Preferably, the amount of heat generated by the heating elements 102, 104 is adjustable so that the resin can be heated in accordance with ambient temperature to achieve the proper curing time. One method of adjusting the heat output is to mount the heaters 102 pivotally on a rail 106 which, in turn, is attached to the movable element of a hydraulic actuator 108 so that when the hydraulic actuator is in a first position the elements direct their heat towards the sheet 16 and when the actuator moves to a second position it moves the rail 106 and rotates the heating elements 102 to direct the heat obliquely to the sheet.

Figure 4:
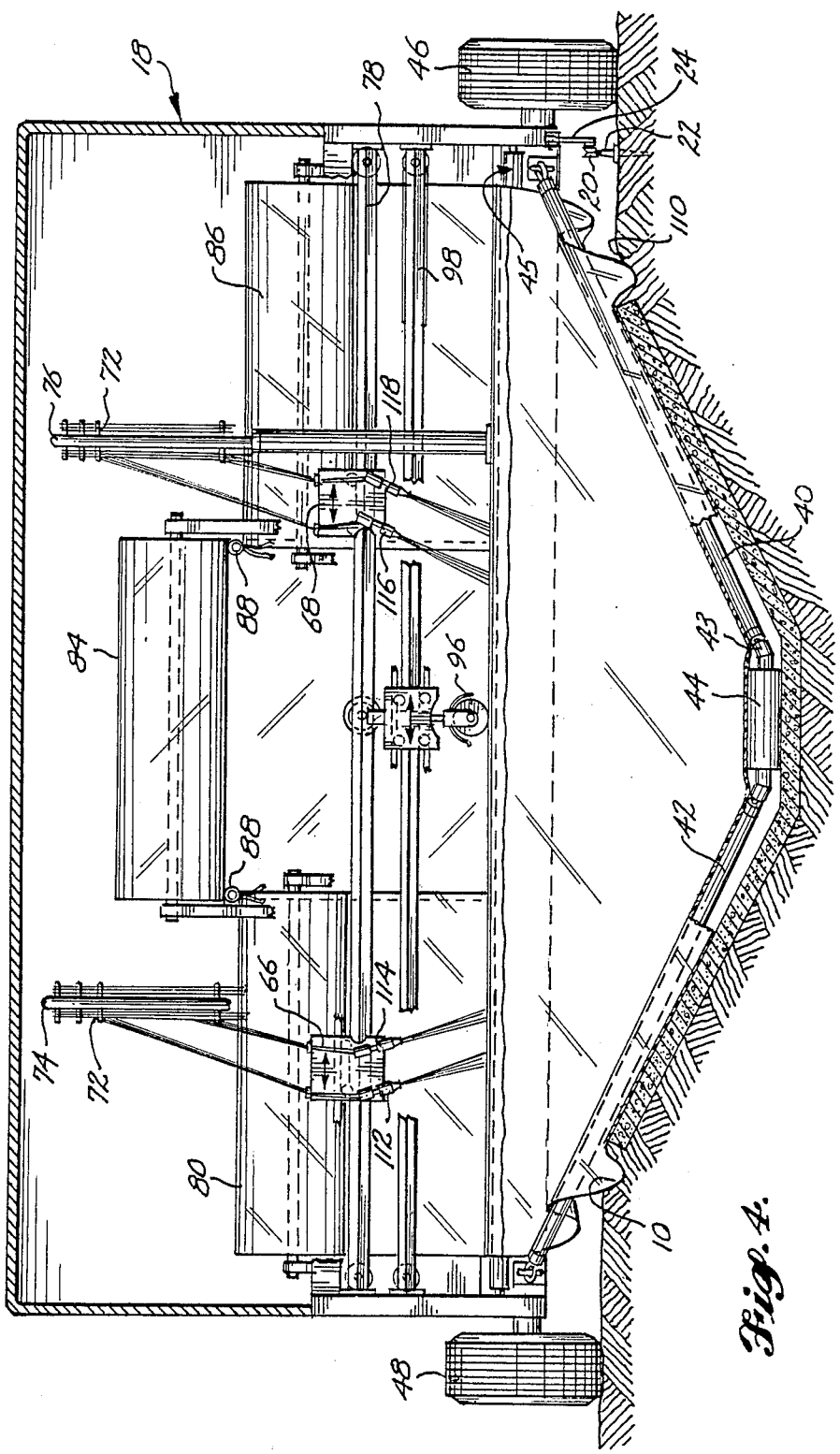
FIG. 4 is a rear elevational view of the machine in FIG. 2.

FIG. 4 is a rear view of the fabricating apparatus and gives a good indication of the way that the sheet is laid down into the canal. The dirt along each edge of the concrete liner 14 is removed to form shallow trenches 108, 110 along each edge of the canal. As the sheet 16 is laid into the canal the edges of the sheet lap over the edges of the concrete and into the trenches 108, 110. After the sheet 16 is laid down and cured, dirt can be backfilled into the trenches 108, 110 so that the edges of the sheet 16 are buried. Burying the edges of the sheet 16 in this manner prevents the possibility of wind gusts going underneath the sheet 16 and lifting it after it is laid into the canal. FIG. 4 also shows the orientation of the nozzles 112, 114, 116, and 118 on the chopper guns 66, 68 as being directed at an inward angle. This orientation permits sufficient overlap of coverage area at the center of the sheet so that there are no voids at the center of the sheet.

Figure 5:
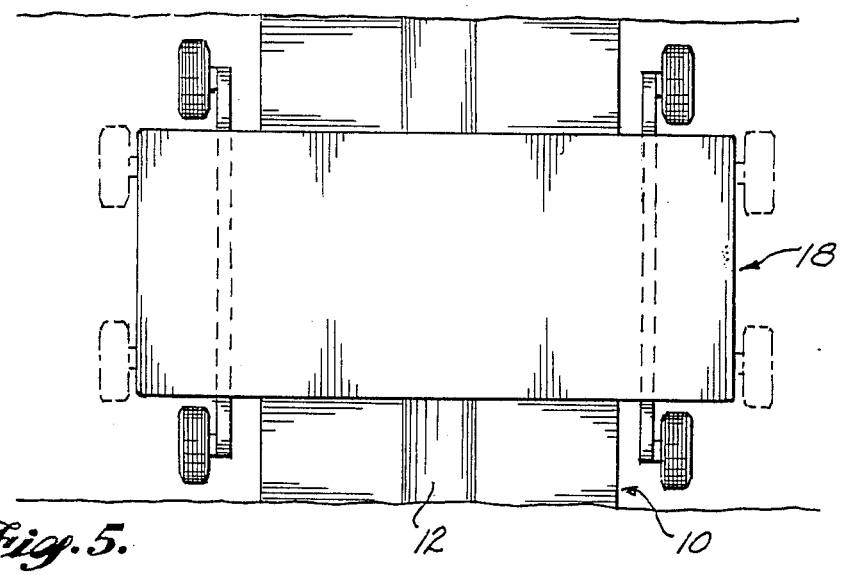
FIG. 5 is a somewhat schematic plan view of alternate configurations of the propulsion means of the sheet fabricating machine shown in FIG. 1.
Figure 6:
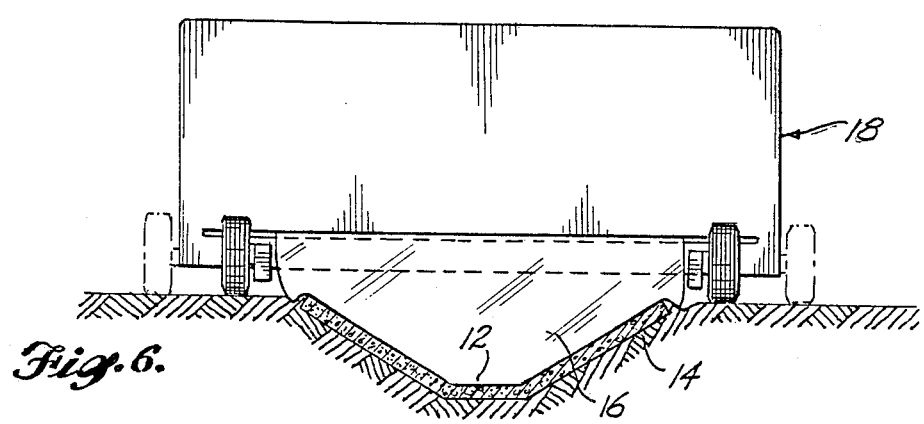
FIG. 6 is a rear elevational view of the machine in FIG. 5.

FIG. 5 is a plan view in outline of the sheet-forming apparatus showing two alternative positions for the wheels of the apparatus. FIG. 6 is a rear elevational view of the apparatus shown in FIG. 5. In the description of the invention so far, the wheels have been mounted at the extreme ends of the machine as shown in dotted line in FIGS. 5 and 6. In the event that a narrower canal is being limited, it is possible that the terrain on which the wheels ride is such that the wheels must be brought closer together. In this event, it is possible to mount the wheels, as shown in FIGS. 5 and 6 in solid line, using mounting beams 120, 122 mounted fore/aft across the apparatus inward from the ends so that the wheels are actually in front of and behind the sheet-forming apparatus rather than at the sides. This configuration can be used only with a narrower sheet, since the sheet must fit between the wheels so that they do not interfere with the sheet as its exits from the machine.

Figure 7:
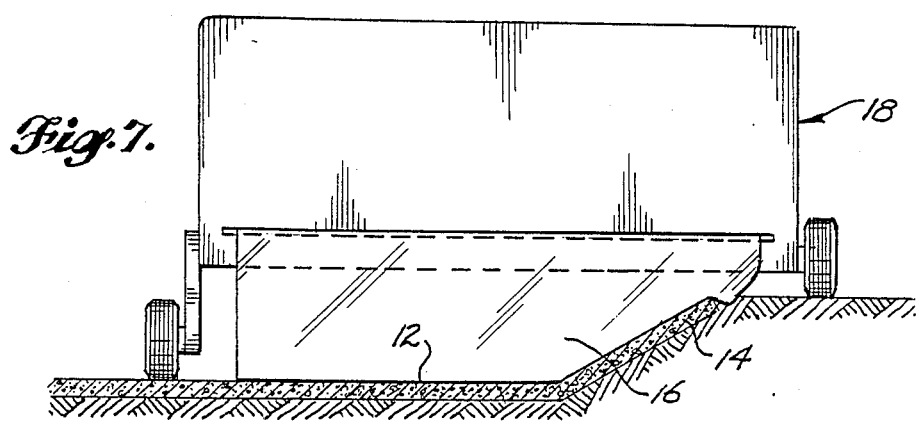
FIG. 7 is a rear elevational view of the machine in FIGS. 5 and 6 with an alternative wheel arrangement to accommodate wider canals.

FIG. 7 shows yet another alternative for wheel mounting in the event that a very wide canal is being lines and so that the liner must be put down in sections. In the configuration of FIG. 7, the wheels on one side of the apparatus are mounted in the usual manner illustrated in FIGS. 1-4. The width of the canal is such that the fabricating apparatus does not straddle the width of the panel. One side of the fabricating apparatus, therefore will actually be in the canal as it operates and, in order to compensate for the difference in height from the bottom of the canal to the side of the canal, it is necessary to place the wheels on one side of the fabricating apparatus on a stilt-like member 124 attached to the frame so that the fabricating apparatus is essentially level as its operates. It can be seen that by using these various wheel placement alternatives canals of a wide range of widths can be lined using the apparatus of the present invention.

In summary, therefore, a method of covering a prepared area of terrain with a continuous sheet of a rigid waterproof plastic material has been described and illustrated along with an apparatus for performing the method. The method includes depositing a layer of resin and fiber onto a flexible carrier web and then laying the carrier web over the prepared terrain surface after cure has begun but before it has been completed so that the carrier web can conform to the approximate shape of the terrain surface. In the event that the terrain area to be covered is a canal or other recessed surface, it is necessary in the practice of the method to avoid random wrinkling of the carrier as it is laid down on the terrain surface and, in order to avoid such random wrinkling, a wrinkle of predetermined shape is induced into the carrier web as it leaves the apparatus and prior to its placement on the ground.

The apparatus for producing the sheet includes a resin-depositing means that typically is mounted for reciprocating movement above the carrier web to deposit a layer of resin on the carrier. The carrier is then fed from the apparatus to the ground as the apparatus moves over the ground. A wrinkle-inducing means is mounted to and carried behind the sheet-forming apparatus. While a preferred embodiment of the method and apparatus have been described and illustrated herein, it should be understood by those of ordinary skill in the art that several changes can be made to the method and to the apparatus while remaining within the scope of the invention. For example, while the method and apparatus have been described for use in lining an irrigation canal by covering a concrete liner already in place in the canal, it would also be possible to lay the plastic sheet directly over the prepared ground without the concrete liner. Also, the method and apparatus of the present invention could be used to lay a sheet of plastic down over a graded road bed prior to the paving of the road bed. The sheet-forming apparatus is preferably self-propelled, however, the particular propulsion means used it not critical to the invention. It may be possible to pull the fabricating apparatus with a tractor or other engine but this is not preferred. Also, typically the sheet will be formed of a polyester resin with glass fiber reinforcing. However, other suitable resins could be used as well as other fibers such as Kevlar, graphite or boron. These other compositions may be unnecessarily expensive for normal application and the choice of materials is based on the end use of the terrain surface. Since many changes can be made to the illustrated embodiments of the invention without exceeding the scope of the invention, the invention should be defined solely by reference to the appended claims.

The embodiment of the invention in which an exclusive property or privilege is claimed are as follows:

1. An apparatus for forming a sheet of fiber-reinforced plastic and laying said sheet on a prepared terrain surface, said apparatus comprising:
    a frame;
    carrier feed means mounted on said frame for feeding a carrier web through said apparatus in a first direction;
    resin and fiber depositing means mounted on said frame for depositing a layer of resin and fiber on said carrier web;
    propulsion means associated with said apparatus to move said apparatus over said prepared terrain surface in a second direction opposite said first direction;
    carrier guide means for guiding said carrier web from said apparatus to said terrain surface after deposition of said resin and fiber layer; and
    pressure roller means mounted on said frame for reciprocating movement over said carrier means in a direction transverse to said first direction in contact with said resin and fiber layer prior to contact of the web with said carrier guide means.

2. The apparatus of claim 1, wherein said pressure roller moves in a direction transverse to said first direction.

3. An apparatus for forming a sheet of fiber-reinforced plastic and laying said sheet on a prepared terrain surface, said apparatus comprising:
    a frame;
    carrier feed means mounted on said frame for feeding a carrier web through said apparatus in a first direction;
    resin and fiber depositing means mounted on said frame for depositing a layer of resin and fiber on said carrier web;
    propulsion means associated with said apparatus to move said apparatus over said prepared terrain surface in a second direction opposite said first direction;
    carrier guide means for guiding said carrier web from said apparatus to said terrain surface after deposition of said resin and fiber layer; and
    wrinkle-inducing means for causing a wrinkle to be formed in said carrier web associated with said frame and positioned to contact said carrier web having the resin and fiber layer on it prior to said web being laid on said terrain surface.

4. The apparatus of claim 3, further including first heating means mounted on said frame spaced from said resin and fiber depositing means in said first direction and overlying said resin and fiber layer.

5. The apparatus of claim 4, further including second heating means mounted on said frame spaced from said resin and fiber depositing means in said first direction and underlying said resin and fiber layer.

6. The apparatus of claim 4, further including heat control means for controlling the amount of heat from said first heating means that reaches said resin and fiber layer.

7. The apparatus of claim 3, wherein said resin and fiber depositing means includes at least one chopper gun mounted on said frame for reciprocating movement in a direction transverse to said first direction.

8. The apparatus of claim 3, wherein said propulsion means is mounted on said frame so that said apparatus is self-propelled.

9. The apparatus of claim 8, further including steering means associated with said propulsion means to guide said apparatus along a desired path.

10. The apparatus of claim 3, wherein said wrinkle-inducing means includes:
    a bottom-riding roller spaced in a first direction from said frame and operable to roll over said terrain surface; and
    first and second web support rollers rotatably mounted at their respective first ends to opposite ends of said bottom-riding roller and at their respective second ends to said frame; the spacing between said second ends of said web support rollers being wider than said carrier web, said first and second web support rollers converging as they extend to said bottom-riding roller, said carrier web overlying said web support rollers as it moves from said frame to said terrain surface.

11. The apparatus of claim 3, further including a tension relief means for relieving the tension on said carrier web as it leaves said frame so that said carrier web sags immediately behind said frame.

12. The apparatus of claim 11, wherein said tension relief means includes:
    power roller means rotatably mounted on said frame underlying and pulling said carrier web; and
    power roll drive means for driving said power roll to pull said carrier web in the first direction at a rate sufficient to relieve the tension in the carrier web caused by drag of the web on the terrain surface such that said carrier web sags after passing over said power roll.

13. An apparatus for forming a sheet of fiber-reinforced plastic and laying said sheet on a prepared terrain surface, said apparatus comprising:
a frame;
carrier feed means mounted on said frame for feeding a carrier web through said apparatus in a first direction, said carrier web being comprised of a predetermined number of strips of web material positioned adjacent one another;
resin and fiber depositing means mounted on said frame for depositing a layer of resin and fiber on said carrier web;
propulsion means associated with said apparatus to move said apparatus over said prepared terrain surface in a second direction opposite said first direction; and
carrier guide means for guiding said carrier web from said apparatus to said terrain surface after deposition of said resin and fiber layer.

14. The apparatus of claim 13, wherein each said strip of web material overlaps the adjacent strip of material.

15. The apparatus of claim 14, further including adhesive application means mounted in said frame for applying adhesive to the overlapping portions of said strips of carrier material.

* * * * *